(12) United States Patent
Dapoz et al.

(10) Patent No.: US 11,537,481 B2
(45) Date of Patent: Dec. 27, 2022

(54) HARDWARE VALIDATION OF SAFETY CRITICAL SCHEDULING

(71) Applicant: Wind River Systems, Inc., Alameda, CA (US)

(72) Inventors: Mark Dapoz, Kanata (CA); Martin Cocking, Kanata (CA)

(73) Assignee: WIND RIVER SYSTEMS, INC., Alameda, CA (US)

( * ) Notice: Subject to any disclaimer, the term of this patent is extended or adjusted under 35 U.S.C. 154(b) by 331 days.

(21) Appl. No.: 16/738,143

(22) Filed: Jan. 9, 2020

(65) Prior Publication Data

US 2021/0216415 A1 Jul. 15, 2021

(51) Int. Cl.
*G06F 11/14* (2006.01)
*G06F 9/48* (2006.01)

(52) U.S. Cl.
CPC ........ *G06F 11/1474* (2013.01); *G06F 9/4881* (2013.01); *G06F 2201/82* (2013.01); *G06F 2209/486* (2013.01)

(58) Field of Classification Search
CPC .............. G06F 11/1474; G06F 9/4881; G06F 2201/82; G06F 2209/486; G06F 9/4887; G06F 11/202; G06F 11/0796

USPC .......................................................... 714/15
See application file for complete search history.

(56) References Cited

U.S. PATENT DOCUMENTS

2014/0047282 A1\* 2/2014 Deb ................... H04L 41/06
714/48
2014/0160895 A1\* 6/2014 Tobias .................. G06F 9/4843
367/137

\* cited by examiner

*Primary Examiner* — Yair Leibovich
(74) *Attorney, Agent, or Firm* — Fay Kaplun & Marcin, LLP

(57) ABSTRACT

The exemplary embodiments are related to a device, a system, and a method for implementing a hardware mechanism that is configured to validate the performance of scheduling software utilized by a safety-critical system. The hardware device may receive an indication that a first frame of a frame schedule is in use. The hardware device may also monitor a time parameter corresponding to the first frame. The hardware device may also determine whether an indication that a second frame of the frame schedule is in use is received prior to the expiration of the time parameter. When the indication that the second frame of the frame scheduler is in use is not received prior to the expiration of time parameter, the hardware device may send a signal to an operating system of the safety-critical system indicating that an error in executing the frame scheduled has occurred.

20 Claims, 4 Drawing Sheets

FPGA register
layout 400 

| Register ID 410 | Description 420 | Processor 430 |
|---|---|---|
| next frame | write to acknowledge next frame is in use | processor 110 |
| frame time | time left in frame | processor 110 |
| frame 212 | time paramater 10 ms | processor 110 |
| frame 214 | time paramater 5 ms | processor 110 |
| frame 216 | time paramater 20 ms | processor 110 |
| next frame | write to acknowledge next frame is in use | processor 112 |
| frame time | time left in frame | processor 112 |
| frame 252 | time paramater 10 ms | processor 112 |
| frame 254 | time parameter 5 ms | processor 112 |
| frame 256 | time paramater 10 ms | processor 112 |
| frame 258 | time parameter 10 ms | processor 112 |

Fig. 4

HARDWARE VALIDATION OF SAFETY CRITICAL SCHEDULING

BACKGROUND INFORMATION

Safety-critical systems are found in a wide array of application areas including, but not limited to, medical devices, avionics, autonomous vehicles, nuclear reactors, etc. The term "safety-critical system" generally refers to a system configured to perform any of a variety of different functions and in the event of a failure, injury to a person, damage to property and/or damage to the environment may occur. During operation, the safety-critical system may utilize a software component to schedule the execution of code by a processing component.

SUMMARY

Some exemplary embodiments include a method performed by a hardware device of a safety-critical system. The method comprises, receiving an indication that a first frame of a frame schedule is in use. The method further comprises, monitoring a time parameter corresponding to the first frame. The method further comprises, determining whether an indication that a second frame of the frame schedule is in use is received prior to the expiration of the time parameter. The method further comprises, sending a signal to an operating system of the safety-critical system indicating that an error in executing the frame scheduled has occurred when the indication that the second frame of the frame scheduler is in use is not received prior to the expiration of time parameter.

Other exemplary embodiments include a safety-critical system comprising an operating system running on one or more processors, where a first processor is configured to run execute a frame schedule. The safety-critical system further comprising, a hardware device configured to monitor the frame schedule. Monitoring the frame schedule includes, receiving an indication that a first frame of the frame schedule is in use and monitoring a time parameter. Monitoring the frame schedule further includes, determining whether an indication that a second frame of the frame schedule is in use is received prior to the expiration of the time parameter. When the indication that the second frame of the frame scheduler is in use is not received prior to the expiration of time parameter, a signal is sent to the operating system of the safety-critical system indicating that an error in executing the frame scheduled has occurred.

Still further exemplary embodiments include an integrated circuit comprising circuitry configured to receive an indication that a first frame of a frame schedule is being executed by a processor. The integrated circuit further comprising, circuitry configured to monitor a time parameter. The integrated circuit further comprising, circuitry configured to determine whether an indication that a second frame of the frame schedule is being executed by the processor is received prior to the expiration of the time parameter. The integrated circuit further comprising, circuitry configured to send a signal to an operating system of the safety-critical system indicating that an error in executing the frame scheduled has occurred when the indication that the second frame of the frame scheduler is in use is not received prior to the expiration of time parameter.

BRIEF DESCRIPTION OF THE DRAWINGS

FIG. 4 shows an example of an FPGA register layout according to various exemplary embodiments

DETAILED DESCRIPTION

Figure 1:
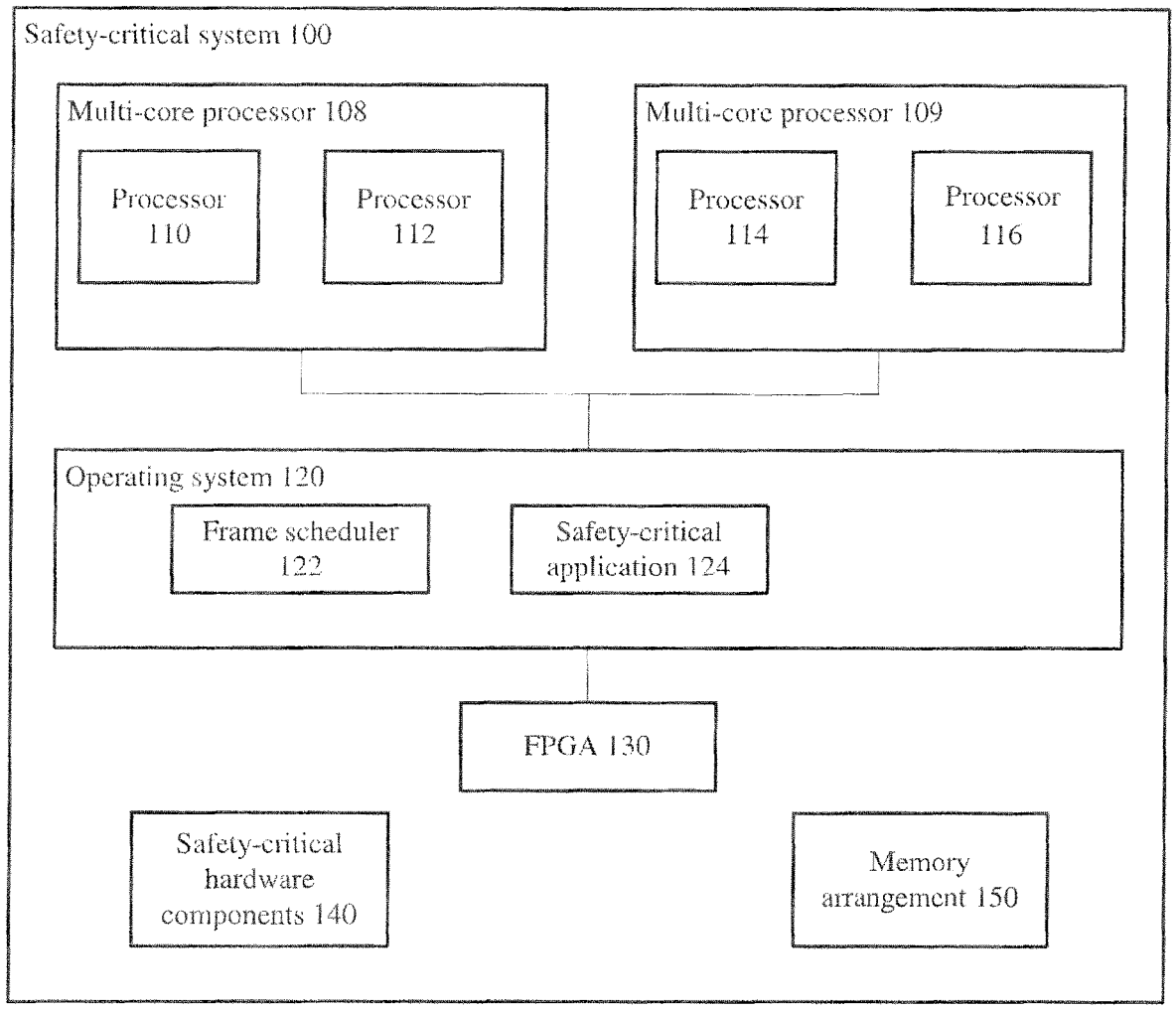
FIG. 1 shows a safety-critical system equipped with hardware validation according to various exemplary embodiments.

The exemplary embodiments may be further understood with reference to the following description and the related appended drawings, wherein like elements are provided with the same reference numerals. The exemplary embodiments are related to a device, a system, and a method for implementing a hardware mechanism that is configured to validate the performance of scheduling software utilized by a safety-critical system. The hardware mechanism provides an additional layer of safety to the safety-critical system.

The exemplary embodiments are described with regard to a safety-critical system. The term "safety-critical system" may generally refer to a system configured to perform any of a variety of different functions and in the event of a failure, injury to a person, damage to property and/or damage to the environment may occur. Those skilled in the art would understand that the scope of the term safety-critical system is very broad. For instance, safety-critical systems are included in a wide array of different application areas including, but not limited to, elevators, fire alarms, medical devices (e.g., intensive care, life support, ventilator, defibrillator, dialysis machine, pumps, medical imaging, etc.), amusement park rides, scuba diving equipment, trains, boats, aircrafts, automobiles, autonomous vehicles, spacecrafts, drones, air traffic control systems, power plants, telecommunication systems, nuclear reactors, etc. However, reference to the term safety-critical system is merely for illustrative purposes, a similar concept may be referred to by a different name.

A single object (e.g., device, vehicle, equipment, etc.) may include one or more safety-critical systems. For example, an aircraft may include a wide array of safety-critical systems such as, but not limited to, a heads-up display, an angle of attack system, an engine control system, etc. In another example, a blood gas analyzer, a medical device configured to monitor oxygen levels in a patient's blood, may include a warning system that is configured to generate an alert when an abnormal oxygen level is identified. Those skilled in the art would understand that not every system within the same object is a safety-critical system. Thus, one or more safety-critical systems may coexist in a single object with other systems configured to perform functions that are not considered to be safety-critical.

The exemplary embodiments are described with regard to a software component of a safety-critical system referred to as a frame scheduler. Those skilled in the art will understand that the frame scheduler schedules when processes (e.g., code) are to be executed by the processing hardware. Processes that may be executed simultaneously may be grouped in frames and each frame may have a predetermined time duration. The frame schedule may have a cyclic rotation of frames where the frames are executed in accordance with their corresponding predetermined time duration. The frame scheduler and other components of the safety-critical system will be described in more detail below with regard to FIG. 1. However, reference to the term frame scheduler and frame schedule is merely for illustrative purposes, different entities may refer to similar concepts by different names.

The exemplary embodiments relate to a hardware mechanism that is configured to monitor the frame schedule. Conventionally, safety-critical systems rely on the frame scheduler to transition to the next frame of the frame schedule and do not utilize hardware validation. Due to the risk of injury and damage inherent with safety-critical systems, executing processes in accordance with the frame schedule is crucial. Thus, the exemplary embodiments provide an additional layer of safety to the safety-critical system by implementing hardware validation of software-based scheduling.

The exemplary embodiments are concerned with ensuring that the safety-critical system is executing code in accordance with the frame schedule. However, the contents of the code and the purpose of the safety-critical system as a whole is not relevant to the exemplary embodiments. Those skilled in the art will understand that the concepts described herein are applicable to any safety-critical system that utilizes a frame scheduler or similar software-based component to schedule when particular processes are to be executed by hardware. The exemplary embodiments may be incorporated into any current or future implementation of a safety-critical system that utilizes a frame scheduler or similar type of component in any appropriate application area.

FIG. 1 shows a safety-critical system 100 equipped with hardware validation according to various exemplary embodiments. As indicated above, the exemplary embodiments are concerned with scheduling the execution of code. However, the contents of the code and the purpose of the safety-critical system 100 is not relevant to the exemplary embodiments. The exemplary embodiments not limited to any particular application area and the safety-critical system 100 may represent a safety-critical system in any appropriate application area. Thus, the safety-critical system 100 represents a safety-critical system included in any appropriate object.

The safety-critical system 100 is shown as including two multi-core processors 108, 109. In this example, processor 110, 112 each represent a core of the multi-core processor 108 and processors 114, 116 each represent a core of the multi-core processor 109. The multi-core processors 108, 109 may be implemented as integrated circuits and thus, may include input circuitry to receive signals and processing circuitry to process the signals and other information. However, reference to this type of configuration is only for illustrative purposes. Those skilled in the art would understand that a safety-critical system may utilize any combination of one or more processors that each include one or more processing cores or any other appropriate hardware.

The safety-critical system 100 is also shown as including an operating system 120. In this example, the operating system 120 may be run on one or more of the multi-core processors 108, 109. The kernel of the operating system 120 may include a frame scheduler 122. The frame scheduler 122 may perform various operations including scheduling and dispatching frames for execution by one or more of the processors 110-116. As will be described below with regard to FIG. 2, a processing core may be used to execute a frame schedule. Thus, the frame scheduler 122 may manage a frame schedule for each processor 110-116.

The operating system 120 may also be configured to run a safety-critical application 124. Each frame may include code corresponding to the safety critical application 124. For example, if the safety-critical system 100 was included in an aircraft, the safety-critical application 124 may relate to a heads-up display, an angle of attack system, an engine control system, etc. In another example, if the safety-critical system 100 was a blood gas analyzer, the safety-critical application 124 may relate monitoring oxygen levels and generating an alert. Thus, the frame scheduler 122 may dispatch frames that include code corresponding to the safety-critical application 124 to the processors 110-116 to ensure that the intended functionality of the safety-critical system is performed.

The safety-critical system 100 further includes a memory arrangement 150 and safety-critical hardware components 140. The memory 150 may be a hardware component configured to store code and data used to operate the safety-critical system 100. The safety-critical hardware components 140 represent various hardware components (other than the processors 110-116) configured to perform various operations for the safety-critical system 100. For example, if the safety-critical system 100 was included in an aircraft, the safety-critical hardware components 140 may comprise sensors, displays, wires, actuators, hydraulics, etc. In another example, if the safety-critical system 100 was included in a blood gas analyzer, the safety-critical hardware components 140 may comprise sensors, displays, wires, LEDs, audio output devices, etc. The exemplary embodiments are concerned with scheduling the execution of code. However, the content of the code and the purpose of the safety-critical system 100 is not relevant to the exemplary embodiments. Thus, the safety-critical application 124 and the safety-critical hardware components 140 may represent any of a wide variety of hardware and software components that may be included in any appropriate type of safety-critical system.

The hardware component that is configured to validate the performance of the frame scheduler 124 may be referred to as a field-programmable gate array (FPGA) 130. The FPGA 130 may represent an integrated circuit configured to implement any of a variety of different logic functions. Further, the FPGA 130 may communicate with the frame scheduler 122. Thus, the FPGA 130 may include input circuitry to receive signals and processing circuitry to process the signals and other information. However, reference to an FPGA is only for illustrative purposes. The functionality described herein for the FPGA 130 may also be implemented by a different hardware device, e.g., a separate processor, an application specific integrated circuit (ASIC), etc. Further, reference to a single FPGA is also merely for illustrative purposes. An actual safety-critical system may be equipped with any appropriate number of FPGAs.

In some embodiments, the hardware and software components of the safety-critical system 100 may be exclusive to the safety-critical system 100. In other embodiments, the hardware and software components of the safety-critical system 100 may be shared with other safety-critical systems included in the same object and/or other systems that are not characterized as safety-critical.

In the event of a fault or a failure, the safety-critical system 100 may be configured to perform any of variety of different mitigation techniques. Those skilled in the art will understand the type of hardware and software errors/malfunctions that may constitute a fault or failure in the context of a safety-critical system. As will be described below, some exemplary embodiments may initiate the performance of a mitigation technique by the safety-critical system 100 if the FPGA 130 identifies an error in the execution of a frame schedule.

One example of a mitigation technique may include utilizing redundant components. Within the context of the safety-critical system 100 executing one or more frame schedules, utilizing redundant components may include transitioning from a core of the multi-core processor 108 to a core of the multi-core processor 109 or vice versa. To provide a general example, the frame scheduler 122 may configure a first frame schedule for the processor 110 of the multi-core processor 108 and a second frame schedule for the processor 112 of the multi-core processor 108. If the operating system 120 identifies an indication of an error in the execution of the safety-critical application 124, the frame scheduler 122 may switch to utilizing the processor 114 of the multi-core processor 109 to execute the first frame schedule and/or the processor 116 of the multi-core processor 109 to execute the second frame schedule. Other mitigation techniques may include, but are not limited to, restarting the safety-critical system 100, powering down the safety-critical system 100, transmitting (directly or indirectly) an indication to a remote location and generating an alert intended to be identified by a human operator.

Figure 2:
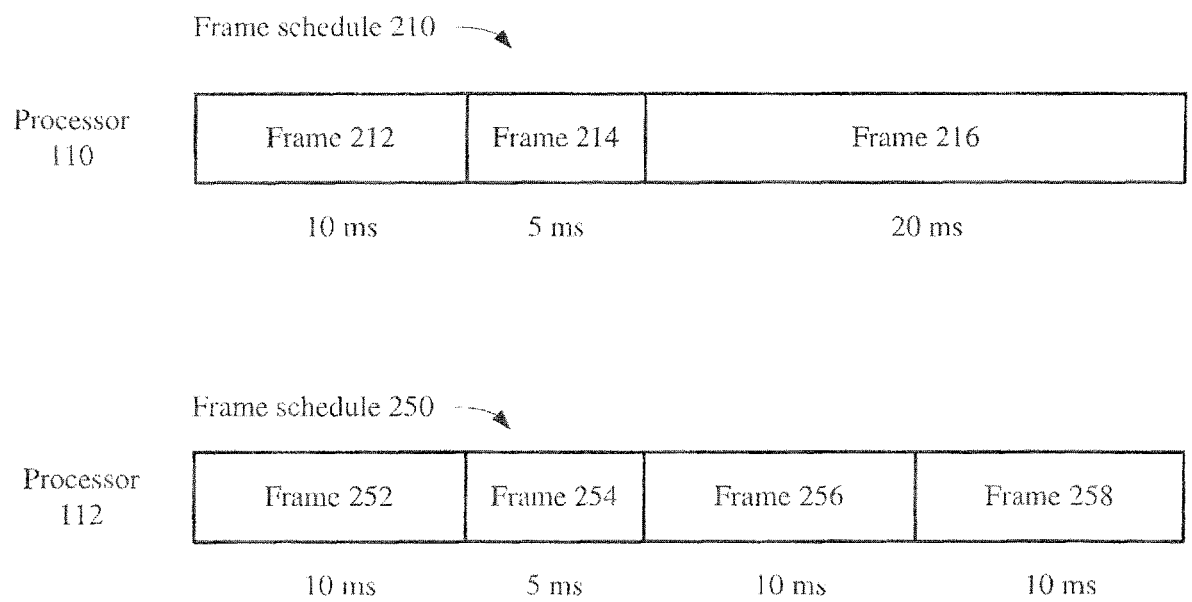
FIG. 2 illustrates a first exemplary frame schedule corresponding to the processor of the multi-core processor and a second exemplary frame schedule corresponding to the processor of the multicore processor.

FIG. 2 illustrates a first exemplary frame schedule 210 corresponding to the processor 110 of the multi-core processor 108 and a second exemplary frame schedule 250 corresponding to the processor 112 of the multicore processor 108. Reference to two frame schedules is merely for illustrative purposes, those skilled in the art would understand that the exemplary embodiments may apply to any number of frame schedules corresponding to any number of processors and/or processing cores.

The number of frames in a frame schedule and their respective durations are predetermined. As mentioned above, each frame represents processes (e.g., code) corresponding to the safety-critical application 124 that may be executed by a processor simultaneously. In this example, the first frame schedule 210 includes three frames 212-216. Frame 212 is shown as having a 10 millisecond (ms) duration, frame 214 is shown as having a 5 ms duration and frame 216 is shown as having a 20 ms duration. The second frame schedule 250 includes four frames 252-258. Frame 252 is shown as having a 10 ms duration, frame 254 is shown as having a 5 ms duration, frame 256 is shown as having a 10 ms duration and frame 258 is shown as having a 10 ms duration. However, the first frame schedule 210 and the second frame scheduler 250 are merely provided for illustrative purposes, the exemplary embodiments apply to a frame schedule possessing any appropriate set of characteristics.

During operation of the safety critical system 100, the frame scheduler 122 may initially dispatch the frame 212 to the processor 110. The frame 212 is scheduled for 10 ms. Upon the expiration of the 10 ms, an interrupt is used to denote the end of the frame 212 and cause the processing of the frame 212 to stop. Subsequently, the frame scheduler 122 transitions to the next frame by dispatching frame 214 to the processor 110. The frame 214 is scheduled for 5 ms. Upon the expiration of the 5 ms, an interrupt is used to denote the end of the frame 214 and cause the processing of the frame 214 to stop. The frame scheduler 122 transitions to the next frame by dispatching frame 216 to the processor 110. The frame 216 is scheduled for 20 ms. Upon the expiration of the 20 ms, an interrupt is used to denote the end of the frame 216 and cause the processing of the frame 216 to stop. The frame schedule 210 is cyclical and thus, after the execution of frame 216, the frame scheduler transitions back to frame 212 and the above process repeats.

With regard to the processor 112, the frame scheduler 122 may initially dispatch the frame 252 to the processor 112. The frame 252 is scheduled for 10 ms. Upon the expiration of the 10 ms, an interrupt is used to denote the end of the frame 252 and cause the processing of the frame 252 to stop. Subsequently, the frame scheduler 122 transitions to the next frame by dispatching frame 254 to the processor 112. The frame 254 is scheduled for 5 ms. Upon the expiration of the 5 ms, an interrupt is used to denote the end of the frame 254 and cause the processing of the frame 254 to stop. The frame scheduler 122 transitions to the next frame by dispatching frame 256 to the processor 112. The frame 256 is scheduled for 10 ms. Upon the expiration of the 10 ms, an interrupt is used to denote the end of the frame 256 and cause the processing of the frame 256 to stop. The frame scheduler 122 transitions to the next frame by dispatching frame 258 to the processor 112. The frame 258 is scheduled for 10 ms. Upon the expiration of the 10 ms, an interrupt is used to denote the end of the frame 258 and cause the processing of the frame 256 to stop. Like the frame schedule 210, the frame schedule 250 is cyclical and thus, after the execution of frame 258, the frame scheduler transitions back to frame 252 and the above process repeats.

Conventionally, the frame scheduler 122 is trusted to perform the frame transition and there is no hardware validation to ensure that the frame transition occurred. However, for any of a variety of different reasons, the frame transition may not be performed at its scheduled time. The exemplary embodiments add an additional layer of safety to the safety-critical system 100 by utilizing the FPGA 130 to validate the frame schedule.

Figure 3:
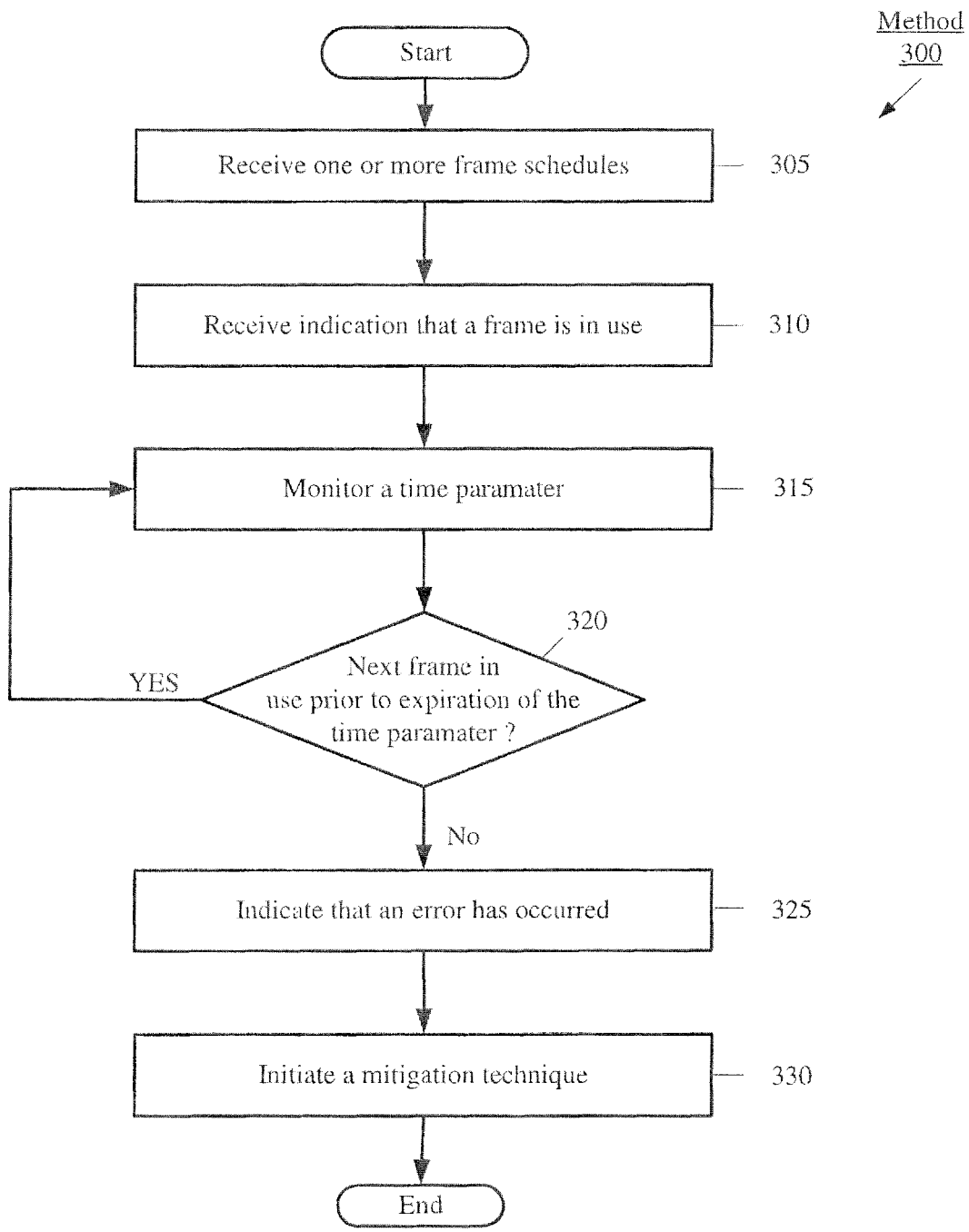
FIG. 3 shows a method for performing hardware validation of safety-critical scheduling.

FIG. 3 shows a method 300 for performing hardware validation of safety-critical scheduling. The method 300 will be described with regard to the safety-critical system 100 of FIG. 1 and the frame schedules 210, 250 of FIG. 2.

In 305, the FPGA 130 receives one or more frame schedules that are to be executed by the safety-critical system 100. For example, the FGPA 130 may receive the first frame schedule 210 and the second frame schedule 250. Since the frame schedules are predetermined, the FPGA 130 may receive the one or more frame schedules at any time prior to the execution of the one or more frame schedules by the safety-critical system 100.

In 310, the FPGA 130 receives an indication that a frame is in use. For example, the frame scheduler 122 may notify the FPGA 130 that frame 212 has been dispatched to processor 110 and/or that frame 252 has been dispatched to processor 112.

In 315, the FPGA 130 monitors a time parameter using a clock. The time parameter may correspond to the predetermined time duration of the frame that is in use. The clock may be a system clock for the safety-critical system 100 or a clock specific to the FPGA 130. Since the FPGA 130 knows the predetermined duration of the frame that is currently in use, the clock may indicate to the FPGA 130 whether the frame transition has occurred at its scheduled time.

In 320, the FPGA 130 determines whether an indication that the next frame of the frame schedule is in use is received prior to the expiration of the time duration corresponding to the current frame. If this indication is received prior to the expiration of the time duration, this indicates that the strict frame schedule is being followed and the method 300 returns to 315. If the indication is not received, this may indicate an error in the execution of the frame schedule and the method 300 continues to 325.

In 325, the FPGA 130 signals to the operating system 120 that an error has occurred. For example, the indication that the next frame is in use may not be received due to a software fault or the indication that the next frame is in use may be received after the expiration of the time duration.

In 330, the operating system 120 initiates a mitigation technique based on the error. As mentioned above, the mitigation technique may include, but is not limited to, utilizing redundant components, restarting the safety-critical system 100, powering down the safety-critical system 100, transmitting an indication to a remote location and generating an alert intended to be identified by a human operator. Subsequently, the method 300 ends.

If the safety-critical system 100 fails over to the redundant components, the FPGA 130 may continue to monitor the execution of the frame schedule by the redundant processor. For example, if safety-critical system 100 is notified by the FPGA 130 of an error in the execution of frame schedule 210, the safety-critical system 100 may then utilize the processor 114 to execute the frame schedule 210 instead of the processor 110.

The method 300 was described in the context of monitoring a single frame schedule. However, this process may be simultaneously occurring for multiple frame schedules. In some embodiments, a single FPGA 130 monitors more than one frame schedule. In other embodiments, an FPGA is specific to a single frame schedule, specific to a single multi-core processor or specific to a single processing core.

From the perspective of the FPGA 130, register files may be utilized to perform various operations. For example, in response to receiving the indication that a frame is in use (e.g., 310, 320 of the method 300), the FPGA 130 may write to a register to acknowledge that a frame is in use. Throughout this description, this register may be referred to as "next frame register." Each time the next frame register is written, a value corresponding to the frame's predetermined duration is loaded into a different register. Throughout this description, this register may be referred to as the "frame time register."

The frame time register counts down based on actual time and if the time parameter corresponding to the current frame expires before the next frame register is written, this may indicate to the FGPA 130 that an error in executing the frame schedule has occurred. As indicated above, the FPGA 130 may track this time parameter using a system clock of the safety-critical system 100 or a clock specific to the FPGA 130.

FIG. 4 shows an example of an FPGA register layout 400 according to various exemplary embodiments. The FPGA register layout 400 is described with regard to the frame schedule 210 and the frame schedule 250 of FIG. 2 and the method 300 of FIG. 3. Column 410 of the register layout 400 includes a register ID, column 420 includes a description and column 430 of the FPGA indicates the corresponding processor.

To provide a general example of how the functionality of the FPGA register layout 400 may be utilized within the context of the method 300 consider the following exemplary scenario. The FPGA 130 is loaded with the frame schedule 210 and the frame schedule 250. Initially, the safety-critical system 100 is initiated. Subsequently, the FGPA 130 receives an indication that the frame 212 has been dispatched to the processor 110 and the frame 252 has been dispatched to the processor 112 which corresponds to 310 of the method 300.

The next frame register corresponding to the processor 110 is written for a first time and the next frame register corresponding to the processor 112 is also written for a first time. In response, the time parameter corresponding to the frame 212 is loaded into the frame time register corresponding to the processor 110 and the time parameter corresponding to the frame 252 is loaded into the frame time register corresponding to the processor 112. In this example, both frames 212, 252 have a 10 ms time duration.

The frame time register counts down based on a clock. If the next frame register corresponding to the processor 110 is written for a second time before the 10 ms expires, the above described process repeats itself. Thus, the time parameter corresponding to frame 214 is loaded into the frame time register corresponding to the processor 110. In this example, the time duration for the frame 214 is 5 ms. If the next frame register corresponding to the processor 110 is written for a third time before the 5 ms expires, the above described process repeats itself. Thus, the time parameter corresponding to frame 216 is loaded into the frame time register corresponding to the processor 110. In this example, the time duration for the frame 216 is 20 ms. If the next frame register corresponding to the processor 110 is written for a fourth time before the 20 ms expires, the above described process repeats itself. Since the frame schedule is cyclical, the time parameter corresponding to frame 212 is loaded into the frame time register corresponding to the processor 110. This process may continue for the duration of the operation of the safety-critical system 100. As shown above, if an error is identified, a mitigation technique may be initiated.

Regarding the frame schedule 250, if the next frame register corresponding to the processor 112 is written for a second time before the 10 ms expires, the above described process repeats itself. Thus, the time parameter corresponding to frame 254 is loaded into the frame time register corresponding to the processor 112. In this example, the time duration for the frame 254 is 5 ms. If the next frame register corresponding to the processor 112 is written for a third time before the 5 ms expires, the above described process repeats itself. Thus, the time parameter corresponding to frame 256 is loaded into the frame time register corresponding to the processor 112. In this example, the time duration for the frame 256 is 10 ms. If the next frame register corresponding to the processor 112 is written for a fourth time before the 10 ms expires, the above described process repeats itself. Thus, the time parameter corresponding to frame 258 is loaded into the frame time register corresponding to the processor 112. In this example, the time duration for the frame 258 is 10 ms. If the next frame register corresponding to the processor 112 is written for a fifth time before the 10 ms expires, the above described process repeats itself. Since the frame schedule is cyclical, the time parameter corresponding to frame 252 is loaded into the frame time register corresponding to the processor 110. This process continues for the duration of the operation of the safety-critical system 100.

As indicated above in 320-325 of the method 300, if an error is identified, a mitigation technique may be initiated. In this example, the error may be an instance in which the next frame register is not written or an instance in which the next frame register is written after the expiration of the time parameter. The mitigation techniques may include utilizing redundant components, restarting the safety-critical system 100, powering down the safety-critical system 100, transmitting (directly or indirectly) an indication to a remote location and generating an alert intended to be identified by a human operator.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a hardware device of a safety-critical system:
   receiving an indication that a first frame of a frame schedule is in use;
   monitoring a time parameter corresponding to the first frame;
   determining whether an indication that a second frame of the frame schedule is in use is received prior to the expiration of the time parameter; and
   when the indication that the second frame of a frame scheduler that is in use is not received prior to the expiration of time parameter, sending a signal to an operating system of the safety-critical system indicating that an error in executing the second frame scheduled has occurred.

2. The method of claim 1, wherein the signal indicating that an error in executing the frame schedule has occurred causes the safety-critical system to implement a mitigation technique.

3. The method of claim 2, wherein the mitigation technique includes one of i) utilizing redundant components, ii) restarting the safety-critical system, iii) powering down the safety-critical system and iv) generating an alert.

4. The method of claim 1, wherein the frame schedule includes a plurality of frames and each frame represents a set of processes that are to be executed by a processing core simultaneously.

5. The method of claim 1, wherein the hardware device is a field-programmable gate array (FPGA).

6. The method of claim 5, further comprising:
   in response to receiving the indication that the first frame is in use, writing to a first register of a plurality of registers included in the FPGA.

7. The method of claim 6, wherein the time parameter corresponding to the first frame is determined based on a second register of the plurality of registers included in the FPGA.

8. The method of claim 1, wherein monitoring the time parameter is based on one of a system clock of the safety-critical system or a clock of the hardware device.

9. A safety-critical system, comprising:
   an operating system running on one or more processors, wherein a first processor is configured to run execute a frame schedule; and
   a hardware device configured to monitor the frame schedule, wherein monitoring the frame schedule includes:
   receiving an indication that a first frame of the frame schedule is in use;
   monitoring a time parameter;
   determining whether an indication that a second frame of the frame schedule is in use is received prior to the expiration of the time parameter; and
   when the indication that the second frame of a frame scheduler that is in use is not received prior to the expiration of time parameter, sending a signal to the operating system of the safety-critical system indicating that an error in executing the second frame scheduled has occurred.

10. The safety-critical system of claim 9, wherein the signal indicating that an error in executing the frame schedule has occurred causes the safety-critical system to implement a mitigation technique.

11. The safety-critical system of claim 10, wherein the mitigation technique includes utilizing redundant components.

12. The safety-critical system of claim 10, wherein the mitigation technique includes one of i) restarting the safety-critical system, ii) powering down the safety-critical system and iii) generating an alert.

13. The safety-critical system of claim 9, wherein the frame schedule includes a plurality of frames and each frame of the plurality of frames has a predetermined time duration.

14. The safety-critical system of claim 13, wherein each frame represents a set of processes that are to be executed by the first processor simultaneously.

15. The safety-critical system of claim 14, wherein the set of processes represents code of a safety-critical application.

16. The safety-critical system of claim 9, wherein the indication that the first frame is in use is received from a software component included in a kernel of the operating system.

17. The safety-critical system of claim 9, wherein monitoring the time parameter is based on one of a system clock of the safety-critical system or a clock of the hardware device.

18. An integrated circuit, comprising:
   circuitry configured to receive an indication that a first frame of a frame schedule is being executed by a processor;
   circuitry configured to monitor a time parameter;
   circuitry configured to determine whether an indication that a second frame of the frame schedule is being executed by the processor is received prior to the expiration of the time parameter; and
   circuitry configured to send a signal to an operating system of the safety-critical system indicating that an error in executing the second frame scheduled has occurred when the indication that the second frame of a frame scheduler that is in use is not received prior to the expiration of time parameter.

19. The integrated circuit of claim 18, wherein the integrated circuit is a field-programmable gate array (FPGA).

20. The integrated circuit of claim 19, further comprising:
   in response to receiving the indication that the first frame is in use, writing to a first register of a plurality of registers included in the FPGA.

* * * * *